United States Patent [19]

Hunt

[11] Patent Number: 5,761,490

[45] Date of Patent: Jun. 2, 1998

[54] CHANGING THE MEANING OF A PRE-DECODE BIT IN A CACHE MEMORY DEPENDING ON BRANCH PREDICTION MODE

[75] Inventor: Douglas B. Hunt, Fort Collins, Colo.

[73] Assignee: Hewlett-Packard Company, Palo Alto, Calif.

[21] Appl. No.: 654,440

[22] Filed: May 28, 1996

[51] Int. Cl.⁶ .................................................. G06F 9/38
[52] U.S. Cl. .................... 395/586; 395/389; 395/570; 395/584; 395/587
[58] Field of Search .................................. 395/570, 580, 395/584, 586, 587, 389

[56] References Cited

U.S. PATENT DOCUMENTS

| | | | |
|---|---|---|---|
| 5,056,091 | 10/1991 | Hunt | 395/182.08 |
| 5,136,697 | 8/1992 | Johnson | 395/586 |
| 5,155,832 | 10/1992 | Hunt | 395/447 |
| 5,228,131 | 7/1993 | Ueda et al. | 395/587 |
| 5,353,421 | 10/1994 | Emma et al. | 395/587 |
| 5,398,328 | 3/1995 | Weber et al. | 395/500 |
| 5,420,990 | 5/1995 | McKeen et al. | 395/392 |
| 5,421,022 | 5/1995 | McKeen et al. | 395/800 |
| 5,453,927 | 9/1995 | Matsuo | 395/582 |
| 5,454,117 | 9/1995 | Puziol et al. | 395/800 |
| 5,485,587 | 1/1996 | Matsuo et al. | 395/581 |
| 5,511,175 | 4/1996 | Favor et al. | 395/392 |
| 5,515,518 | 5/1996 | Stiles et al. | 395/586 |
| 5,649,178 | 7/1997 | Blaner et al. | 395/587 |

OTHER PUBLICATIONS

Microprocessor Report, Linley Gwennap, Nov., 1, 1994, vol. 8 No. 15, PA-8000 Combines Compexity and Speed. IEEE Computer Society Press Reprint, Advanced Performance Features of the 64-Bit PA-8000, 1063-6390/95.

*Primary Examiner*—Kenneth S. Kim

[57] ABSTRACT

A system for changing the meaning of a pre-decode branch field associated with an instruction in an instruction cache memory of a computer system compatible with multiple branch prediction modes. The system includes a pre-decode unit for decoding instructions from a main memory. The pre-decode unit sets a pre-decode branch field for each branch instruction according to a current branch prediction mode context at the time of pre-decoding. The branch instruction is then inserted into an instruction cache memory. An instruction fetch unit fetches a pre-decoded instruction from the instruction cache and further decodes the instruction. If the instruction is a branch, a branch prediction unit interprets the pre-decode branch field of the branch instruction and computes a predicted branch direction according to the current branch prediction mode and its defined branch prediction mode context. The fetched instruction is inserted into an instruction buffer pending execution by an execution unit. Each of the multiple branch prediction modes result in a different method of predicting a branch instruction direction. In addition, the meaning of a pre-decode branch field differs for each of the defined branch prediction mode contexts defined for each of the multiple branch prediction modes.

14 Claims, 6 Drawing Sheets

CHANGING THE MEANING OF A PRE-DECODE BIT IN A CACHE MEMORY DEPENDING ON BRANCH PREDICTION MODE

FIELD OF THE INVENTION

The present invention relates generally to a microprocessor system which provides multiple branch prediction mode compatibility, and more particularly, to a system and method for changing the meaning of pre-decode bits in an instruction cache memory depending on a branch prediction mode.

BACKGROUND OF THE INVENTION

General purpose microprocessor systems are known in the art. In a typical microprocessor system, data and instructions are stored in a location-addressable system memory, and instructions are executed by a central processing unit (CPU), typically in a sequential inline fashion.

Instructions are usually represented in the form of binary numbers. A single instruction generally includes at least an opcode, which is a binary representation of a particular instruction code. Depending on the particular instruction, it may also include one or more operands. In addition, most instructions include one or more control bits for keeping track of additional information required for processing.

Execution of an instruction typically consists of three stages:

1. An instruction fetch stage;
2. An operation stage; and
3. A memory access stage.

During the instruction fetch stage, an instruction is fetched from memory. In the operation stage, the instruction is decoded and any arithmetic operations (including address calculation) are performed. During the memory access stage, data is read from or written to system memory. Generally, different functional hardware units in the CPU carry out the operations of the three stages separately. Often, these functional units are referred to as the instruction fetch unit, the execution unit, and the memory management unit, respectively. Thus, execution of each instruction requires at least three clock cycles. Because each stage requires at least a full clock cycle to complete, most modern microprocessor systems utilize an instruction pipeline. Instruction pipelining is a known method in the art for allowing instruction execution to be overlapped.

Table 1, shown below, illustrates typical prior art operation of an instruction pipeline.

TABLE 1

| Cycle # | Instruction Fetch | Operation | Memory R/W |
|---|---|---|---|
| $T_0$ | $I_0$ | X | X |
| $T_1$ | $I_1$ | $I_0$ | X |
| $T_2$ | $I_2 = I_B$ | $I_1$ | $I_0$ |
| $T_3$ | $I_3$ | $I_2 = I_B$ | $I_1$ |
| $T_4$ | $I_{17}$ | X | $I_2 = I_B$ |

As shown in Table 1, the three instruction execution stages are partitioned into three separate functional units, each capable of performing a single operation during each clock cycle. Table 1 shows five execution cycles in which instruction $I_0$, $I_1$, $I_2$, $I_3$, and $I_{17}$ are started. As shown, instructions $I_0$ and $I_1$ cycle through each stage to completion. Thus, even though each instruction requires three clock cycles to complete, ideally one instruction should complete every clock cycle. Thus, with ALU instructions (e.g., ADD, SUB, AND, OR, etc.) and memory access instructions (e.g., LOAD, STORE), instruction pipelining operates to its full capacity. However, conditional program control instructions (e.g., BRE (branch if equal), ERG (branch if greater than), BRL (branch if less than), etc.) complicate the pipeline sequence.

Conditional program control instructions, also called conditional branch instructions, present an alternative in program flow which is dependent upon a realtime condition of program data. Thus, the direction of flow may be determined only in realtime when the condition becomes known. As a result, the instruction fetch unit must either wait until completion of the conditional branch instruction, thereby causing a "bubble" in the instruction pipeline, or it must predict the direction of flow at the risk of predicting incorrectly and thus causing a "bubble" in the instruction pipeline. The latter is one form of a method known as "speculative execution", which is known in the art. More generally, speculative execution is said to occur any time the processing of an instruction is begun before it is known whether the instruction will actually complete. Speculative execution is used to optimize the execution of instructions to improve performance.

The form of speculative execution described above and of concern herein is referred to as "branch prediction". With branch prediction, the instruction fetch unit "guesses" or predicts the outcome of a conditional branch instruction, and proceeds to fetch instructions before the condition becomes known. Instructions are fetched from either the target address or the next inline program address according to the prediction. If, when the condition becomes known, it is determined that the prediction was incorrect, the incorrect instructions which have already been fetched are discarded and instruction fetching resumes from the correct address. For example, with reference to Table 1, instruction $I_2$ is a conditional branch instruction $I_B$. The instruction fetch unit predicts that the branch will not be taken, and instead fetches the next inline program instruction $I_3$ during cycle $T_3$. During realtime operation, the branch actually is taken, and the instruction fetch unit predicted incorrectly. Thus, the fetch of instruction $I_3$ is incorrect (i.e., $I_B$ is a "mispredicted branch"), resulting in a bubble in the pipeline sequence as shown in the operation stage of cycle $T_4$. Instruction $I_3$ is discarded and instruction fetching resumes at the correct address (i.e., the branch target address) with a fetch of instruction $I_{17}$.

In order to perform branch prediction speculative execution, it is necessary to include, during the instruction fetch stage, a decode of the fetched instruction to determine if it is a branch instruction, and the branch prediction itself to predict whether a branch will be taken or not-taken when executed.

Often, a cache memory will be employed to speed up the branch prediction process. Generally, in a system that employs a cache memory, instructions are moved from main memory into the cache memory by the hardware as the instructions are needed. Since main memory accesses are slower than cache memory accesses, a pre-decode stage is often performed on an instruction during its transfer from main memory and prior to its entry into the instruction cache. By performing pre-decoding of the instruction prior to the actual instruction fetch from the instruction cache by the instruction fetch unit, slow instruction decoding operations are "hidden" in even slower memory transfers. Generally, as an instruction is transferred from main memory and placed into the instruction cache, pre-decoding hardware looks at the instruction opcode, and stores the instruction and associated pre-decode bits in the instruction cache. The pre-decode bits are used by the instruction fetch unit to speed up the decoding operations in the instruction fetch unit by indicating results of slower operations which were performed during the pre-decode stage.

In a system which utilizes an instruction cache and a pre-decode stage and which performs branch prediction, the instruction fetch unit fetches an instruction from the instruction cache, reads the contents of the branch prediction pre-decode bit to determine if the fetched instruction is a branch instruction, causes branch prediction to be performed for a detected branch instruction, and enters the fetched instruction into an instruction buffer where the fetched instruction is held pending execution by an execution unit.

Generally, there are two types of branch prediction used in the art, namely, "static prediction" and "dynamic prediction". With static prediction, a prediction is made by the compiler prior to run-time. The prediction (taken or not-taken) is encoded in the instruction itself. In dynamic prediction, the predictions (taken or not-taken) are made at run-time according to various aspects of the past behavior of the executing program. The prediction is an output of special prediction hardware which adapts to the program behavior according to a prediction algorithm. Typically, branch history information is stored in a branch history table which is accessed by the prediction hardware and used in the prediction algorithm in predicting the direction of the branch. When a predicted branch is resolved, the branch history information is updated.

Conventional computer systems which implement branch prediction speculative execution operate in either branch prediction mode—that is, either static prediction mode or dynamic prediction mode, but not both.

SUMMARY OF THE INVENTION

In accordance with the preferred embodiment of the invention, there is presented a system and method for changing the meaning of pre-decode bits associated with an instruction in an instruction cache depending on the current branch prediction mode in a multiple branch prediction mode compatible computer.

The system of the present invention includes a pre-decode unit for decoding instructions from main memory. The pre-decode unit sets a pre-decode branch prediction field for each branch instruction according to a current branch prediction context at the time of pre-decoding. The branch instruction is then inserted into an instruction cache memory. An instruction fetch unit fetches a pre-decoded instruction from the instruction cache and further decodes the instruction. If the instruction is a branch, a branch prediction unit interprets the pre-decode branch prediction field of the branch instruction and determines a predicted branch direction according to the current branch prediction mode and its defined branch prediction context. The fetched instruction is inserted into an instruction buffer pending execution by an execution unit. Each of the multiple branch prediction modes result in a different method of predicting a branch instruction outcome. In the preferred embodiment, each of the multiple branch prediction modes defines a different branch prediction context used in interpreting the pre-decode branch prediction sub-field.

The method of the present invention allows a pre-decode branch-prediction field to take on different meanings according to different branch prediction mode contexts in a computer system compatible with multiple branch prediction modes. The method comprises two concurrently running processes. In the first process, an instruction being transferred from main memory is received and decoded to determine whether it is a branch instruction. If the instruction is not a branch instruction, a pre-decode branch field is set to indicate that the instruction is not a branch. If the fetched instruction is a branch instruction, the current branch prediction mode is determined. The pre-decode branch prediction field is set according to a current branch prediction context defined for the current branch prediction mode. The instruction and its pre-decode branch field are entered into an instruction cache.

In the second process, an instruction is fetched from the instruction cache and decoded. The current branch prediction mode is determined and the pre-decode branch field is interpreted according to the current branch prediction context defined for the current branch prediction mode to determine if branch prediction is required. If branch prediction is required, branch prediction is performed using a current branch prediction method defined for the current branch prediction mode. A branch prediction indicator associated with the fetched instruction is set to indicate a predicted branch direction of the fetched instruction. The fetched instruction is entered into an instruction buffer pending execution by an execution unit.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

Figure 1:
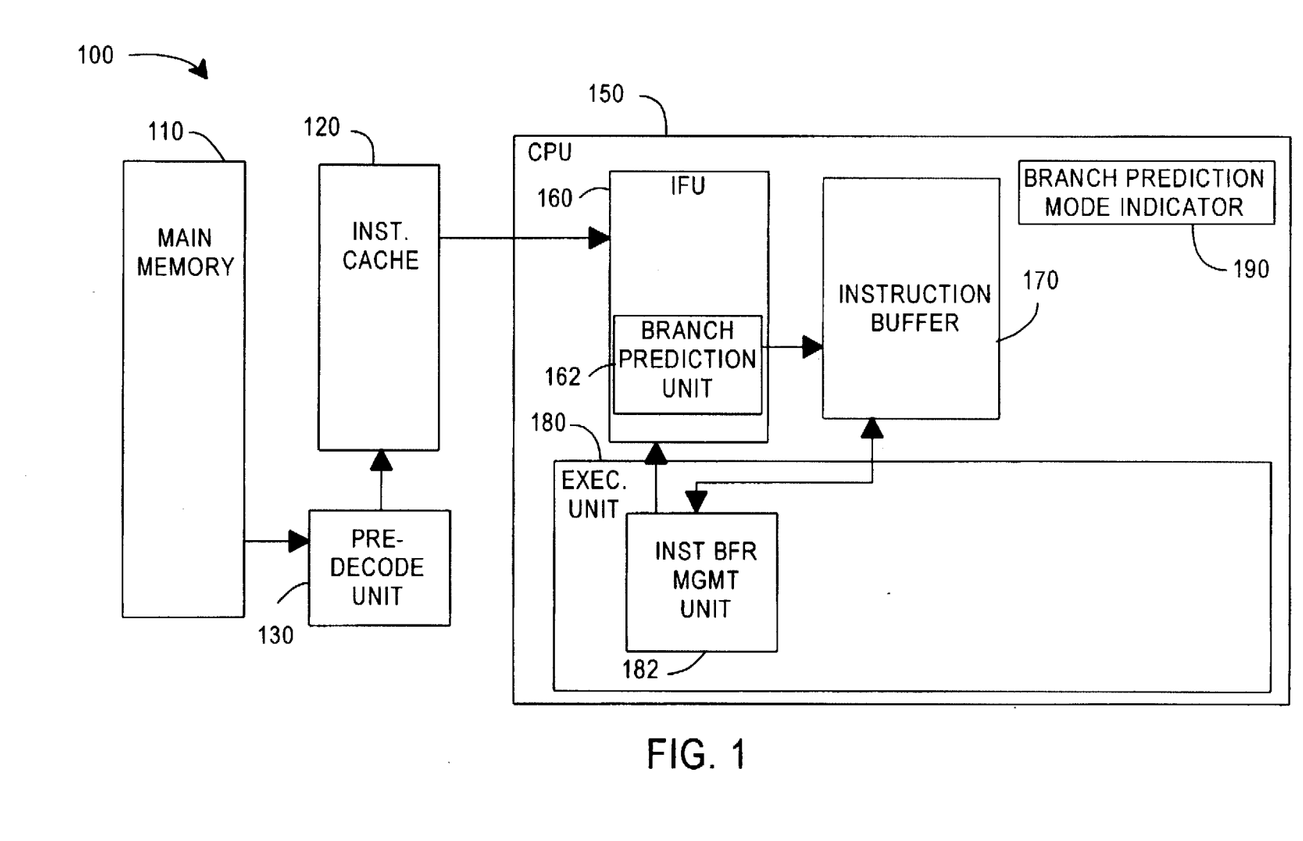
FIG. 1 is a block diagram of a microprocessor system in which the present invention operates.

FIG. 1 shows a block diagram of a portion of a computing system 100 in which the present invention operates. The computing system 100 includes a main memory 110, a central processing unit (CPU) 150, an instruction cache 120, and a pre-decode unit 130. The pre-decode unit 130 may reside within the CPU 150 itself, or separately as shown in FIG. 1. The CPU 150 includes an instruction fetch unit 160, an instruction buffer 170, an execution unit 180, and a branch prediction mode indicator 190. The instruction fetch unit 160 includes a branch prediction unit 162. The execution unit 180 also includes an instruction buffer management unit 182. The branch mode indicator 190 indicates the current branch prediction mode of the currently running process.

Figure 2:
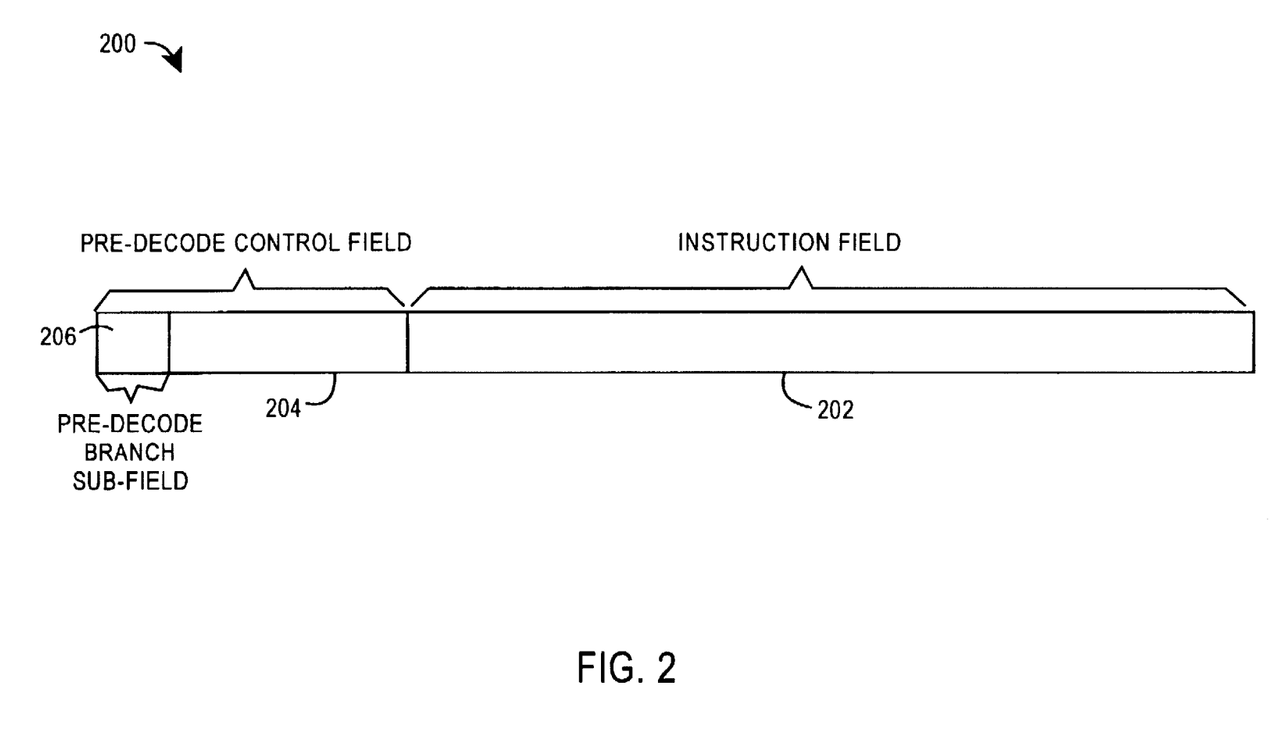
FIG. 2 is a diagram of an instruction cache entry in accordance with the present invention.

The instruction cache 120 of the preferred embodiment is implemented using a high-speed SRAM which has faster access time than the main memory. The instruction cache 120 comprises a plurality of instruction cache entries, each of which comprise an instruction and associated pre-decode bits. FIG. 2 illustrates a preferred embodiment for an instruction cache entry 200 in accordance with the present invention. As shown in FIG. 2, the instruction cache entry 200 includes an instruction field 202 for storing an instruction opcode and associated operands, and a pre-decode control field 204. The pre-decode control field 204 includes a pre-decode branch subfield 206. The pre-decode branch sub-field 206 is used, among other things, to indicate whether its associated instruction is a branch instruction. The number of bits used to implement the pre-decode branch sub-field 206 depends on both the number of branch prediction modes supported by the multiple branch prediction mode compatible computer system and on the type of information provided in a given branch prediction mode context. In the preferred embodiment, the computer system supports both static prediction mode and dynamic prediction mode, and the context of each mode allows the pre-decode branch subfield 206 to be implemented in only a single bit. The context of static and dynamic modes in the preferred embodiment are discussed hereinafter.

Figure 3:
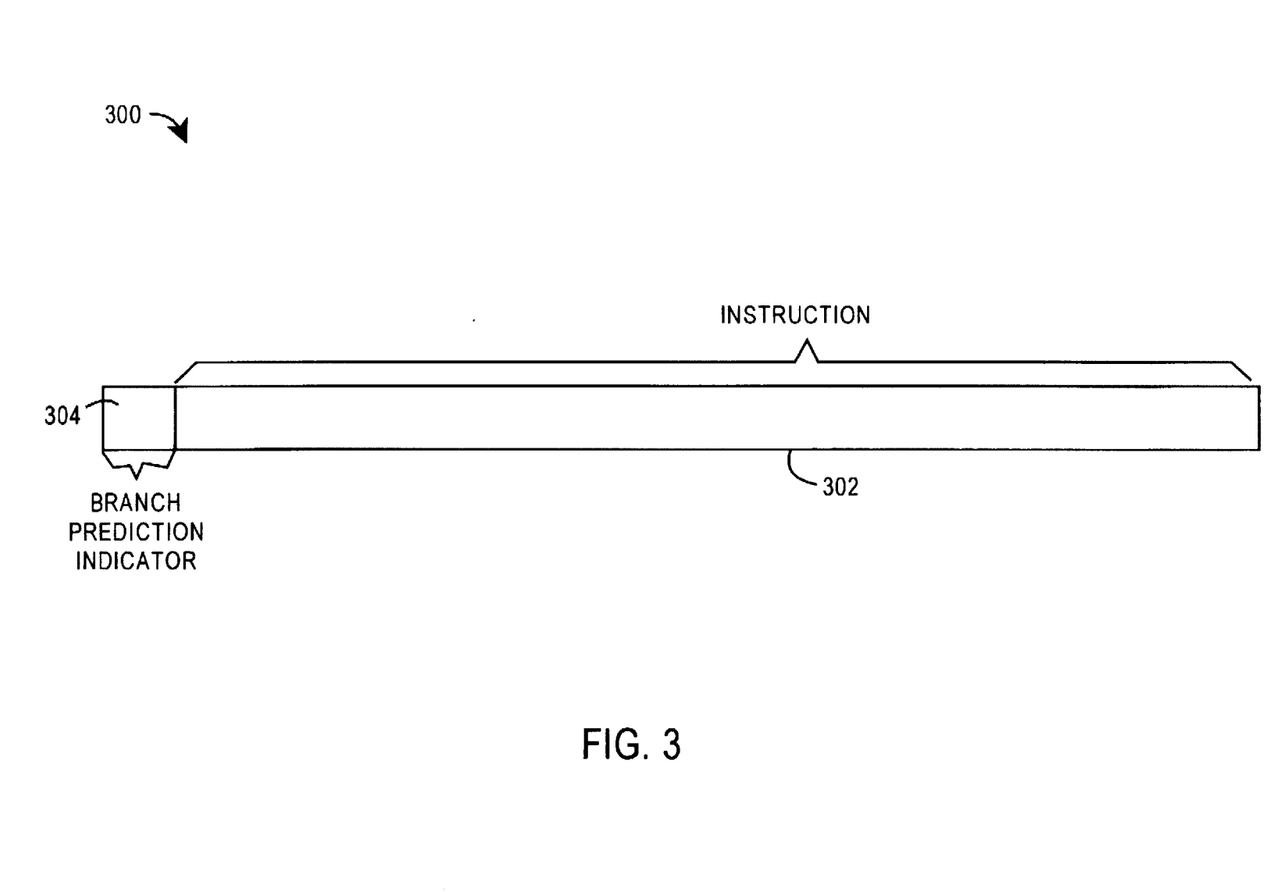
FIG. 3 is a diagram of an instruction buffer entry in accordance with the present invention.

The instruction buffer 170 comprises a plurality of instruction buffer entries, each of which comprise an instruction opcode and an associated branch prediction indicator. FIG. 3 illustrates a preferred embodiment for an instruction buffer entry 300 in accordance with the present invention. As shown in FIG. 3, the instruction buffer entry 300 includes an instruction field 302 in which an instruction opcode and associated operands reside, and a branch prediction indicator 304. In the preferred embodiment, the branch prediction indicator 304 is implemented with a single bit which is set (logic value=1) to indicate that the branch was predicted taken and is not set (logic value=0) to indicate that the branch was predicted not-taken.

In operation, instructions are moved from the main memory 110 into the instruction cache 120 by hardware as the instructions are required. The pre-decode unit 130 decodes instructions as they are moved from the main memory 110 into the instruction cache 120. During decoding of an instruction, the pre-decode unit 130 actually looks at the instruction field 202 and sets its associated pre-decode control field 204 according to various attributes about the actual instruction. The associated pre-decode branch subfield 206 could be implemented using a single bit to merely indicate that the instruction is a branch, or could include several bits to provide more information about the branch instruction. According to the inventive principles of the present invention, the meaning of the pre-decode branch sub-field 206 differs when it is decoded by the instruction fetch unit 160 depending on the current branch prediction mode and according to the context of the current branch prediction mode. The details of each branch prediction mode context in the preferred embodiment are discussed hereinafter. After an instruction is pre-decoded and the bits of its associated pre-decode control field 204 are set by the pre-decode unit 130, the pre-decoded instruction is entered into the instruction cache 120, where it is held pending a fetch by the instruction fetch unit 160.

The instruction fetch unit 160 in the preferred embodiment operates independently of the pre-decode process, and thus an instruction held in the instruction cache 120 may not get fetched immediately or sometimes not at all. When the instruction fetch unit 160 fetches an instruction from the instruction cache 120, the instruction fetch unit 160 examines the pre-decode branch subfield 206 as set by the pre-decode unit 130 to determine if the fetched instruction is a branch instruction. The essence of the present invention is to allow for different interpretations (i.e., the branch prediction mode contexts) of the pre-decode branch subfield 206 for different branch prediction modes in a multiple branch prediction mode compatible computer. The different branch prediction mode contexts in the preferred embodiment are discussed hereinafter. If the instruction fetch unit 160 detects a branch instruction according to the context of the current branch prediction mode, the direction of the branch is predicted by the branch prediction unit 162. The branch prediction unit 162 sets a branch prediction indicator 304 associated with the branch instruction 302 according to whether the branch is predicted taken or not-taken. The instruction fetch unit 160 then enters the fetched instruction into the instruction buffer 170.

The execution unit 180 executes the instructions contained in the instruction buffer 170. Executed instructions are removed from the instruction buffer 170 in program order.

The instruction buffer management unit 182 monitors the currently executing instruction. When the instruction buffer management unit 182 detects a branch instruction, it monitors the actual branch direction (i.e., whether the actual branch direction was taken or not-taken). The instruction buffer management unit 182 detects the direction of the branch prediction using the branch prediction indicator 304 associated with the branch instruction 302. The actual branch direction is compared to the predicted branch direction. If the actual branch direction matches the predicted branch direction, no action is taken because the prediction was correct and the next instruction in program order is contained in the instruction buffer 190. However, if the actual branch direction does not match the predicted branch direction, then the instructions which were entered into the instruction buffer 170 after entry of the currently executing branch instruction are incorrect. The instruction buffer management unit 182 then removes all instructions which were entered into the instruction buffer 170 after the currently executing branch instruction. In addition, the instruction buffer management unit 182 signals the instruction fetch unit 160 to fetch the correct next instruction.

Figure 4A:
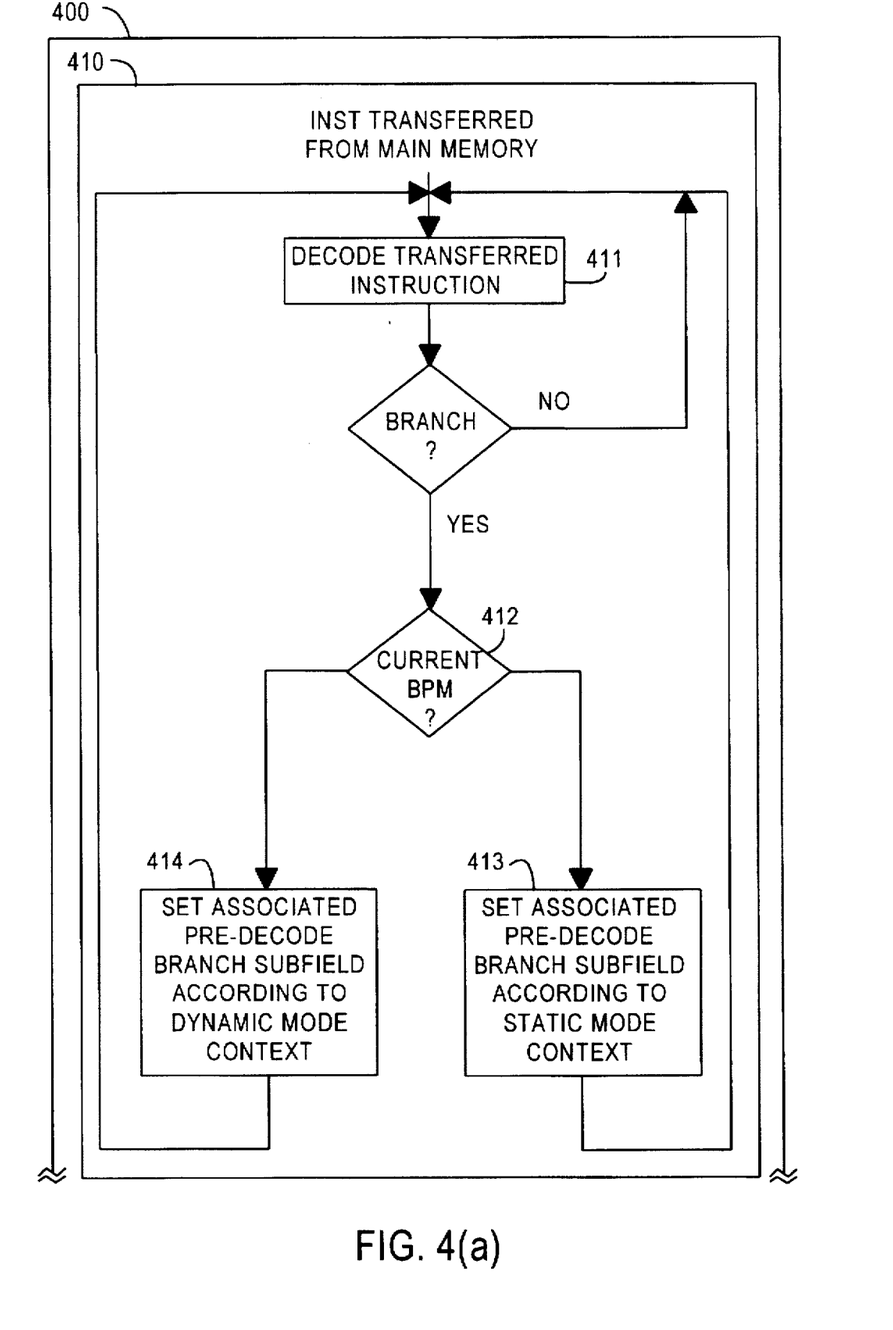
FIG. 4(a) is a flowchart illustrating a first process for performing a pre-decode of an instruction in accordance with the method of the present invention.

FIG. 4 is a flowchart illustrating a method 400 in accordance with the present invention. The method 400 is partitioned into three separate processes 410, 420, 430. The first process 410 is shown in FIG. 4(a) and is performed by the pre-decode unit 130 of FIG. 1. As shown in FIG. 4(a), and with reference to FIGS. 1 and 2, the first process 410 includes a first step 411 of receiving an instruction transferred from main memory and decoding it to determine if it is a branch instruction. If the received instruction is not a branch instruction, the pre-decode branch sub-field 206 is set to indicate that the instruction is not a branch. The first process 410 is complete and another instruction may be received for decoding. If the received instruction is a branch instruction, the first process 410 includes a second step 412 of determining the current branch prediction mode as indicated by the branch prediction mode indicator 190. If the current branch prediction mode is static mode, the first process 410 includes a third step 413 of setting the associated pre-decode branch subfield 206 according to static mode context. In the preferred embodiment, the pre-decode branch subfield 206 is implemented with a single bit which is set only when the instruction opcode itself is encoded to be predicted taken. If, however, the current branch prediction mode is dynamic mode, the first process 410 includes a fourth step 414 of setting the associated pre-decode branch subfield 206 according to dynamic mode context. In the preferred embodiment, the single-bit pre-decode branch subfield is set every time a branch instruction is detected. The completion of third step 413 or fourth step 414 completes the first process 410 and another instruction may be received for decoding.

The second process 420 is shown in FIG. 4(a) and is performed by the instruction fetch unit 160. As shown in FIG. 2(a), and with reference to FIGS. 1 and 2, the second process 420 includes a fifth step 421 of fetching and decoding an instruction from the instruction cache 120. The second process 420 includes a sixth step 422 of determining the current branch prediction mode as indicated by the branch prediction mode indicator 190. If it is determined that the current branch prediction mode is static mode, the second process 420 performs a seventh step 423 of interpreting the associated pre-decode branch bits according to a static mode context. In the preferred embodiment, if the single-bit pre-decode branch sub-field 206 is set while in static mode, it means that the fetched instruction is a branch instruction and that it is to be predicted taken. If the single-bit pre-decode branch sub-field 206 is not set while in static mode, it means that the fetched instruction is either not a branch instruction or, if it is a branch instruction, that it is to be predicted not-taken (and therefore the next instruction fetched will be the next inline instruction).

If, on the other hand, the current branch prediction mode is dynamic mode, the second process 420 performs an eighth step 424 of interpreting the associated pre-decode branch bits according to a dynamic mode context. In the preferred embodiment, if the single-bit pre-decode branch sub-field 206 is set while in dynamic mode, it means that the fetched instruction is a branch instruction and that it is to be predicted using branch history for the instruction. If the single-bit pre-decode branch sub-field 206 is not set while in dynamic mode, it means that the fetched instruction is not a branch instruction.

If branch prediction is required after interpreting the pre-decode branch sub-field 206, actual branch prediction is performed in ninth step 425 according to the current branch prediction mode as indicated by the branch prediction mode indicator 190. In the preferred embodiment, an associated branch prediction indicator 304 is set if the branch is predicted taken and is not set if the branch is prediction not-taken. Finally, the fetched instruction 302 and an associated branch prediction indicator 304 are entered into an instruction buffer 170 in a tenth step 426.

Figure 4B:
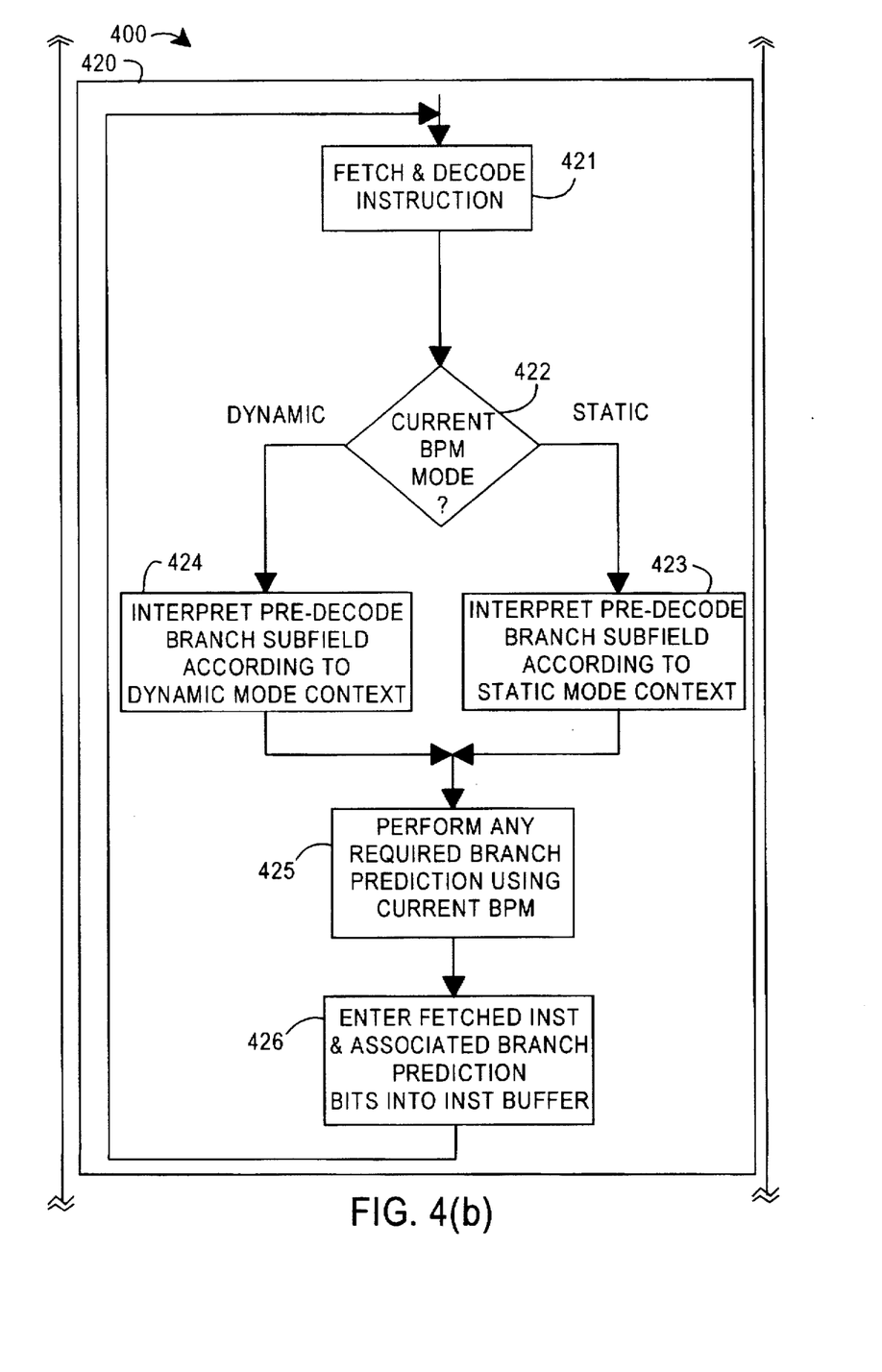
FIG. 4(b) is a flowchart illustrating a second process for fetching and decoding a pre-decoded instruction and performing any required branch prediction in accordance with the method of the present invention.
Figure 4C:
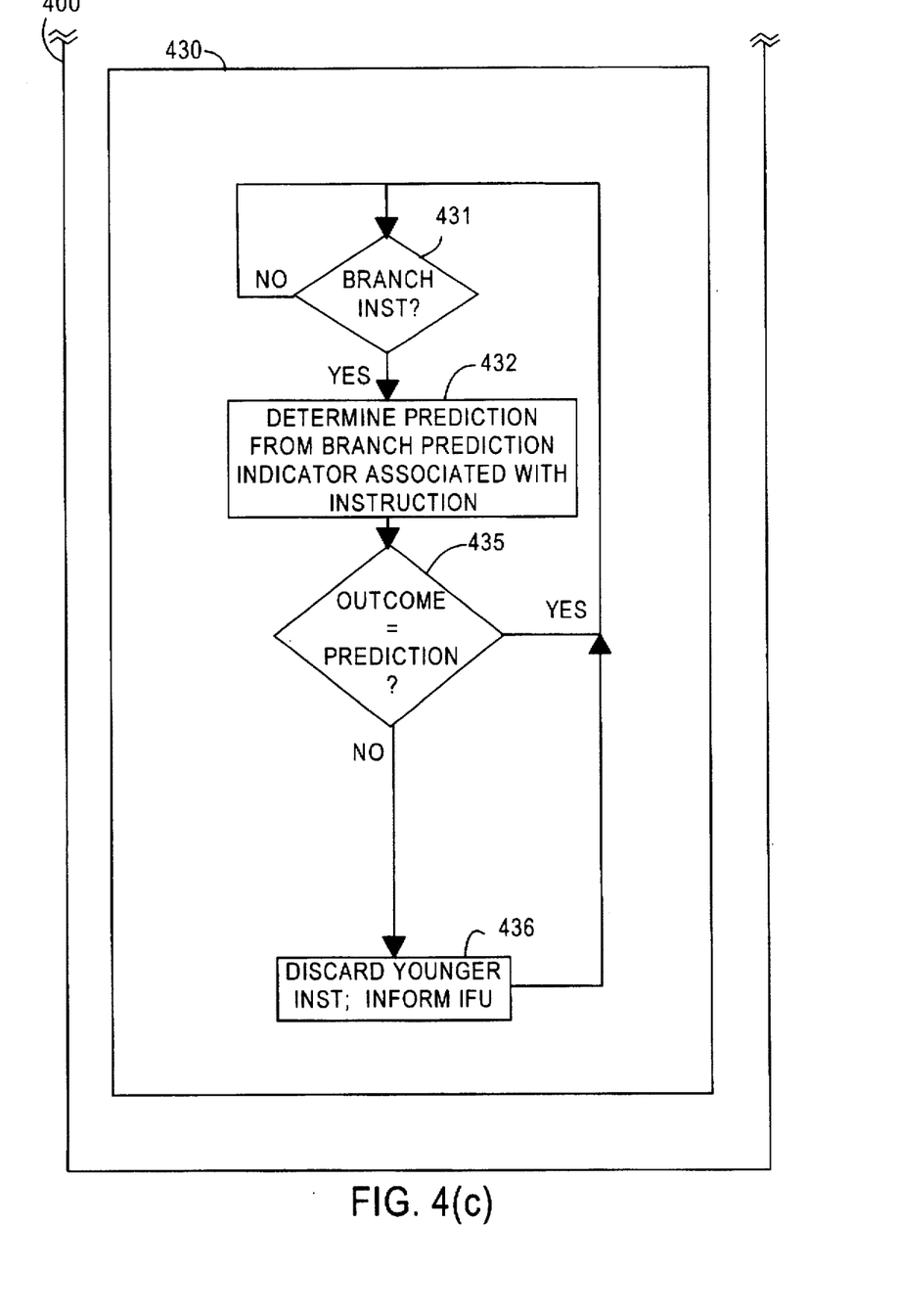
FIG. 4(c) is a flowchart illustrating a third process for managing mispredicted branches in an instruction buffer in accordance with the method of the present invention.

The method 400 of the preferred embodiment of the present invention includes a third process 430, shown in FIG. 4(b), which is performed by the instruction buffer management unit 182 of FIG. 1. The third process 430 detects mispredicted branches and manages the instruction buffer 130 accordingly. The third process 430 includes an eleventh step 431 of determining whether the instruction currently being executed is a branch instruction. If the current instruction is a branch instruction, the second process includes a twelfth step 432 of reading the branch prediction indicator 304 associated with the branch instruction to determine whether the branch was predicted taken or not-taken. The third process 430 the performs a thirteenth step 435 of monitoring the actual branch outcome to determine if the predicted branch direction was correct.

If the predicted branch outcome matches the actual branch outcome, the prediction was correct and the instruction buffer contains the next instruction to be executed in program order. If the predicted branch outcome does not match the actual branch outcome, the branch was incorrect, and the third process 430 performs a fourteenth step 436 of discarding all instructions in the instruction buffer 130 which were inserted after the branch instruction was inserted in the instruction buffer 130. During the fourteenth step 436, the correct calculated address (either the branch target address or the inline program address) is sent to the instruction fetch unit 160, where instruction fetching is resumed from the correct address.

From the above description of the method 400 shown in FIGS. 4(a) and 4(b), it will be appreciated that the present invention may be used to provide a static and dynamic branch prediction mode compatible system, which allows branch instructions to be predicted according to either mode. In addition, the present invention allows the pre-decode bits to take on different meanings depending on the current branch prediction mode of operation. Thus, it will also be appreciated that in providing multiple branch prediction mode compatibility, the method 400 of the present invention requires no additional instruction bits or additional hardware because the pre-decode bits simply change meaning according to the current branch prediction mode.

In the present invention, the meaning of the pre-decode bits differs depending on the context of the current branch prediction mode (static or dynamic). For example, in the preferred embodiment the computer system switches between static mode branch prediction and dynamic mode branch prediction, and a single pre-decode branch bit is used to implement the branch prediction sub-field 206. In the preferred embodiment, if the current branch prediction mode indicates static mode, then the pre-decode bits are to be interpreted by the instruction fetch unit using static mode context. The static mode context of the preferred embodiment defines a set pre-decode branch bit (logic value=1) associated with a fetched instruction from an instruction cache to mean that (1) the current instruction is a branch instruction, and (2) the branch is to be predicted taken. If a pre-decode branch bit is not set (logic value=0), it means that (1) the currently executing instruction is not a branch instruction, or (2) if the currently executing instruction is a branch instruction, it is to be predicted not-taken. A branch prediction indicator associated with an instruction resident in the instruction buffer is set (logic value=1) if the branch was predicted taken and not set (logic value=0) if the branch was predicted not-taken or if the instruction is not a branch.

If in the preferred embodiment the current branch prediction mode indicates dynamic mode, then the pre-decode bits are to be interpreted by the instruction fetch unit using dynamic mode context. The dynamic mode context of the preferred embodiment defines a set pre-decode branch bit (logic value=1) associated with a fetched instruction in an instruction cache to mean that (1) the current instruction is a branch instruction, and (2) the branch is to be predicted according to the branch history. If a pre-decode branch bit is not set (logic value=0), it means that the currently executing instruction is not a branch instruction. A branch prediction indicator associated with an instruction resident in the instruction buffer is set (logic value=1) if the branch was predicted taken and not set (logic value=0) if the branch was predicted not-taken or if the instruction is not a branch.

It is important to note that in the preferred embodiment the interpretation of the pre-decode branch subfield 206 of an instruction 202 in the instruction cache 120 affects only the process execution performance and not its accuracy. Regardless of which branch prediction mode is current at the time the branch instruction is predicted by the branch prediction unit 162, a branch instruction will always be resolved (taken or not-taken) upon actual execution, and the correct next-instruction will always be fetched. Thus, if a branch was pre-decoded in static mode, but at the time of the interpretation of the pre-decode branch subfield by the instruction fetch unit the current branch prediction mode has changed to dynamic mode, the instruction need not be removed from the instruction cache and refetched nor the pre-decode bits recomputed. This follows because if the pre-decode unit sets the branch prediction sub-field according to static mode context, and in static mode context the branch instruction is to be predicted taken, the pre-decode bit implementing the pre-decode branch sub-field in the preferred embodiment will be set. When the branch instruction is fetched after the current branch prediction mode has changed to dynamic mode, the instruction buffer management unit will interpret the set pre-decode branch sub-field as a branch instruction and consult the branch history regardless.

If the pre-decode unit sets the branch prediction sub-field according to static mode context, and in static mode context the branch instruction is to be predicted not-taken, the pre-decode bit will not be set and therefore when the branch instruction is fetched after the current branch prediction mode has changed to dynamic mode, then the instruction fetch unit will not interpret the instruction as a branch at all. Instead the instruction fetch unit 160 will enter the branch instruction into the instruction buffer 170 and its associated branch prediction indicator 304 will not be set. The instruction buffer management unit 182 will recognize the branch instruction as predicted not-taken since the associated branch prediction indicator 304 will not be set. Thus, if the branch is actually taken, the instruction buffer management unit 182 will recognize the branch as mispredicted and therefore cause the instructions which were entered into the instruction buffer 170 after the branch instruction to be removed and the correct branch target address sent to the instruction fetch unit 160.

Similarly, if a branch instruction was pre-decoded and entered into the instruction buffer when the current branch prediction mode was dynamic mode, and at the time the instruction is fetched by the instruction fetch unit 160 the current branch prediction mode has changed to static mode, the instruction fetch unit 160 will predict every branch instruction as taken since the pre-decode branch sub-field 206 is always set. If upon execution the branch is actually not-taken, the instruction buffer management unit will recognize the misprediction, cause all newer instructions to be discarded, and send the correct next instruction address to the instruction fetch unit.

As illustrated above, the branch instructions are always resolved on execution and the correct next address is always fetched. A change in the current branch prediction mode after a branch instruction has been entered into the instruction cache may impact the instruction pipeline performance, but it will not affect the runtime program sequence. However, since it is anticipated that most computer processes will always execute a given branch in the same prediction mode, a change in the current branch prediction mode after a branch instruction has been entered into the instruction cache will rarely occur.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computer system supporting multiple branch prediction modes, said multiple branch predictions modes comprising a first branch prediction mode and a second branch prediction mode, each defining a respective branch prediction mode context and a respective branch prediction method, said system comprising:

a branch prediction mode indicator configurable to set a current branch prediction mode, said current branch prediction mode comprising one of said multiple branch prediction modes and defining a current branch prediction mode context and a current branch prediction method corresponding to said branch prediction mode context and said branch prediction method of said one of said multiple branch prediction modes, an instruction cache;

a pre-decode unit operable to receive and decode an instruction transferred from a main memory; and, if said instruction is a branch instruction, to read said branch prediction mode indicator to determine said current branch prediction mode and to set a pre-decode branch field of said branch instruction according to said current branch prediction mode context; and to enter said instruction into said instruction cache, and an instruction fetch unit operable to fetch and decode said instruction from said instruction cache; and, if said instruction is a branch instruction, to cause a predicted branch direction to be predicted if said pre-decode branch field indicates, according to said current branch prediction mode context, that branch prediction is required, and to set a branch prediction indicator in said fetched instruction to indicate said predicted branch direction; and to enter said instruction into an instruction buffer pending execution by an execution unit.

2. The system of claim 1, comprising:

a branch prediction unit responsive to said instruction fetch unit to predict said branch direction using said current branch prediction method.

3. The system of claim 2, wherein:

said branch prediction unit is further operable to interpret said pre-decode branch field according to said current branch prediction mode context to determine if branch prediction is required.

4. The system of claim 1, wherein:

said branch prediction method corresponding to said first branch prediction mode operates to predict said predicted branch direction according to an encoded prediction encoded in said branch instruction.

5. The system of claim 1, wherein:

said branch prediction method corresponding to said second branch prediction mode operates to predict said predicted branch direction based upon a branch history and a branch prediction algorithm.

6. The system of claim 1, comprising:

an execution unit operable to execute said instruction; and an instruction buffer management unit operable to detect when said execution unit executes said instruction and, if said instruction is a branch instruction, to monitor an actual branch direction as determined by said execution unit upon execution of said branch instruction, to compare said actual branch direction to said predicted branch direction, and to discard all instructions inserted in said instruction buffer after said branch instruction was inserted in said instruction buffer if said predicted branch direction does not match said actual branch direction.

7. A method supporting multiple branch prediction modes in a computer system, said multiple branch predictions modes comprising a first branch prediction mode and a second branch prediction mode, each defining a respective branch prediction mode context and a respective branch prediction method, said computer system comprising a branch prediction mode indicator configurable to set a current branch prediction mode, said current branch prediction mode comprising one of said multiple branch prediction modes and defining a current branch prediction mode context and a current branch prediction method corresponding to said branch prediction mode context and said branch prediction method of said one of said multiple branch prediction modes, said method comprising:

a first process comprising the steps of:

(a) receiving and decoding an instruction transferred from a main memory;

(b) determining whether the instruction is a branch instruction;

(c) if the fetched instruction is a branch instruction, reading said branch prediction mode indicator to determine said current branch prediction mode and setting a pre-decode branch field of said branch instruction according to said current branch prediction mode context; and (d) entering the instruction into an instruction cache; and a second process comprising the steps of:

(e)(i) fetching and decoding the instruction from the instruction cache;

and, if said instruction is a branch instruction:

(e)(ii) reading said branch prediction mode indicator to determine the current branch prediction mode;

(e)(iii) interpreting the pre-decode branch field according to the current branch prediction mode context to determine if branch prediction is required; and (e)(iv) if branch prediction is required, predicting a branch direction using said current branch prediction method and setting a branch prediction indicator in said fetched instruction to indicate said predicted branch direction; and (f) entering the fetched instruction into an instruction buffer pending execution by an execution unit.

8. The method of claim 7, wherein:

said multiple branch predictions modes comprise at least one other branch prediction mode defining at least one other branch prediction mode context and at least one other respective branch prediction method.

9. The method of claim 7, wherein the first branch prediction method comprises the step of:

(j) decoding a branch prediction field encoded in the branch instruction itself.

10. The method of claim 7, wherein the second branch prediction method comprises the step of:

(k) predicting the branch direction based on a branch history of the branch instruction using a branch prediction algorithm.

11. The method of claim 10, wherein the branch history of the branch instruction is stored in a branch history table and the branch prediction algorithm comprises the step of:

(l) predicting the branch direction according to the majority direction of the last n branch executions.

12. The method of claim 7, wherein the meaning of a pre-decode branch field differs between the first branch prediction mode context and the second branch prediction mode context.

13. The method of claim 7, wherein the method of determining a predicted branch direction differs between the first branch prediction method and the second branch prediction method.

14. The method of claim 7, comprising a third concurrently running process comprising the steps of:

(o) detecting a currently executing branch instruction;

(p) monitoring an actual branch direction upon execution of the currently executing branch instruction;

(q) comparing the actual branch direction to said predicted branch direction of the currently executing branch instruction;

(r) if the predicted branch direction of the currently executing branch instruction does not match the actual branch direction, discarding all instructions in the instruction buffer which were inserted after the currently executing branch instruction was inserted in the instruction buffer, and sending a correct fetch address calculated upon execution to an instruction fetch unit to fetch a next instruction from the correct fetch address.

* * * * *